US008578340B1

(12) United States Patent
Daudel et al.

(10) Patent No.: US 8,578,340 B1
(45) Date of Patent: Nov. 5, 2013

(54) RECORDING AND REPLAYING COMPUTER PROGRAM EXECUTION WITH RECORDED EXECUTION EVENT BREAKPOINTS

(75) Inventors: Jeffrey Daudel, South San Francisco, CA (US); Arpad Jakab, Oakland, CA (US); Suman Cherukuri, Cupertino, CA (US); Jonathan Lindo, Emerald Hills, CA (US)

(73) Assignee: CA, Inc., Islandia, NY (US)

( * ) Notice: Subject to any disclaimer, the term of this patent is extended or adjusted under 35 U.S.C. 154(b) by 529 days.

(21) Appl. No.: 12/890,449

(22) Filed: Sep. 24, 2010

(51) Int. Cl.
*G06F 9/44* (2006.01)

(52) U.S. Cl.
USPC ........... 717/129; 717/127; 717/128; 717/131; 710/266; 714/38.13

(58) Field of Classification Search
None
See application file for complete search history.

(56) References Cited

U.S. PATENT DOCUMENTS

| | | | | |
|---|---|---|---|---|
| 5,140,671 | A * | 8/1992 | Hayes et al. | 706/60 |
| 5,157,779 | A | 10/1992 | Washburn et al. | |
| 5,870,607 | A * | 2/1999 | Netzer | 717/127 |
| 5,933,838 | A * | 8/1999 | Lomet | 1/1 |
| 5,999,734 | A * | 12/1999 | Willis et al. | 717/149 |
| 7,100,027 | B1 | 8/2006 | Padwekar | |
| 7,581,220 | B1 * | 8/2009 | Roeck | 718/100 |
| 7,644,396 | B2 | 1/2010 | Cohen | |
| 2003/0005415 | A1 * | 1/2003 | Bates et al. | 717/129 |
| 2004/0153769 | A1 * | 8/2004 | Lee et al. | 714/20 |
| 2006/0167950 | A1 * | 7/2006 | Vertes | 707/200 |
| 2007/0083645 | A1 | 4/2007 | Roeck et al. | |
| 2007/0168995 | A1 * | 7/2007 | Cohen | 717/129 |
| 2007/0168996 | A1 * | 7/2007 | Klein | 717/129 |
| 2007/0226740 | A1 * | 9/2007 | Li et al. | 718/102 |
| 2007/0288901 | A1 * | 12/2007 | Lev et al. | 717/124 |
| 2007/0288902 | A1 * | 12/2007 | Lev et al. | 717/124 |
| 2008/0005193 | A1 | 1/2008 | Lev et al. | |
| 2008/0010532 | A1 | 1/2008 | Lev et al. | |
| 2008/0071947 | A1 * | 3/2008 | Fischer et al. | 710/48 |

(Continued)

OTHER PUBLICATIONS

Title: Breakpoints and Halting in Distributed Programs, author: Miller et al, source: IEEE, dated: Jun. 13, 1988.*

*Primary Examiner* — Chameli Das
(74) *Attorney, Agent, or Firm* — Vierra Magen Marcus LLP

(57) ABSTRACT

A computer program execution record and replay system providing recorded execution event breakpoints is described. In one embodiment, for example, in the record and replay system, a method for providing recorded execution event breakpoints, the method comprising: recording information about one or more execution events that occur during a recorded execution of a computer program; during a replay execution of the computer program in which a particular execution event of the one or more execution events is faithfully reproduced, determining whether a breakpoint is to be set in the replay execution of the computer program based on the recorded information about the particular execution event; and if the breakpoint is to be set, then setting a breakpoint in the replay execution of the computer program such that the replay execution breaks at a point corresponding to the faithful reproduction of the particular execution event.

20 Claims, 8 Drawing Sheets

(56) References Cited

U.S. PATENT DOCUMENTS

| | | |
|---|---|---|
| 2008/0127035 A1 | 5/2008 | Lev et al. |
| 2008/0209096 A1* | 8/2008 | Lin et al. ............... 710/301 |
| 2009/0037651 A1* | 2/2009 | Gorobets ............... 711/103 |
| 2009/0119493 A1* | 5/2009 | Venkitachalam et al. .... 712/238 |
| 2009/0248934 A1* | 10/2009 | Ge et al. ............... 710/261 |
| 2010/0169867 A1 | 7/2010 | Wegmann |
| 2010/0251031 A1 | 9/2010 | Nieh et al. |
| 2010/0299471 A1* | 11/2010 | Shrivastava et al. ......... 710/266 |
| 2011/0016294 A1* | 1/2011 | Brubaker ............... 712/244 |
| 2011/0047415 A1* | 2/2011 | Nanjundaswamy ............ 714/37 |
| 2011/0153862 A1* | 6/2011 | Roosta et al. ............... 709/234 |
| 2011/0191569 A1* | 8/2011 | Ishikawa et al. ............. 712/204 |
| 2011/0307870 A1* | 12/2011 | Stairs et al. ............... 717/128 |

* cited by examiner

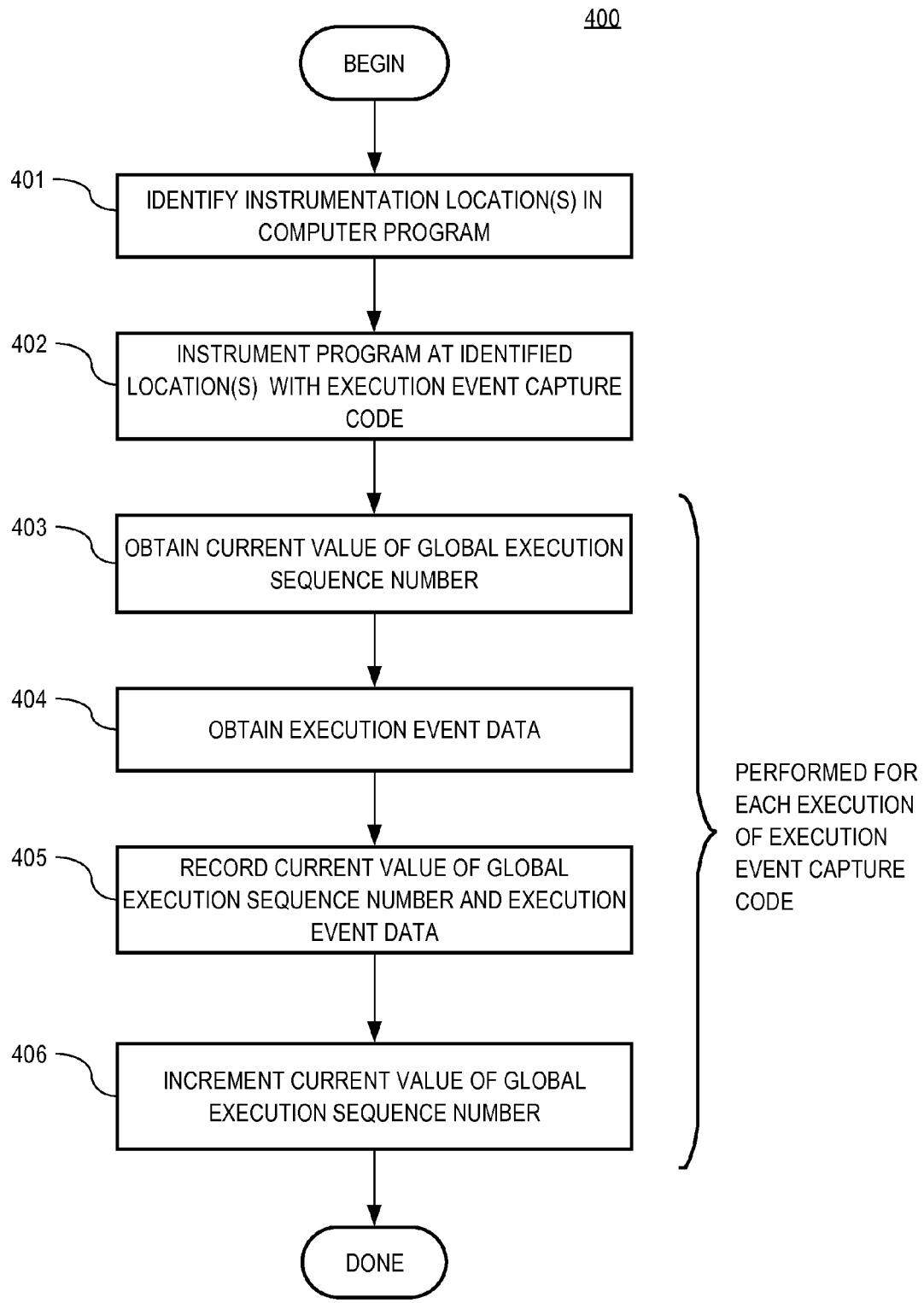

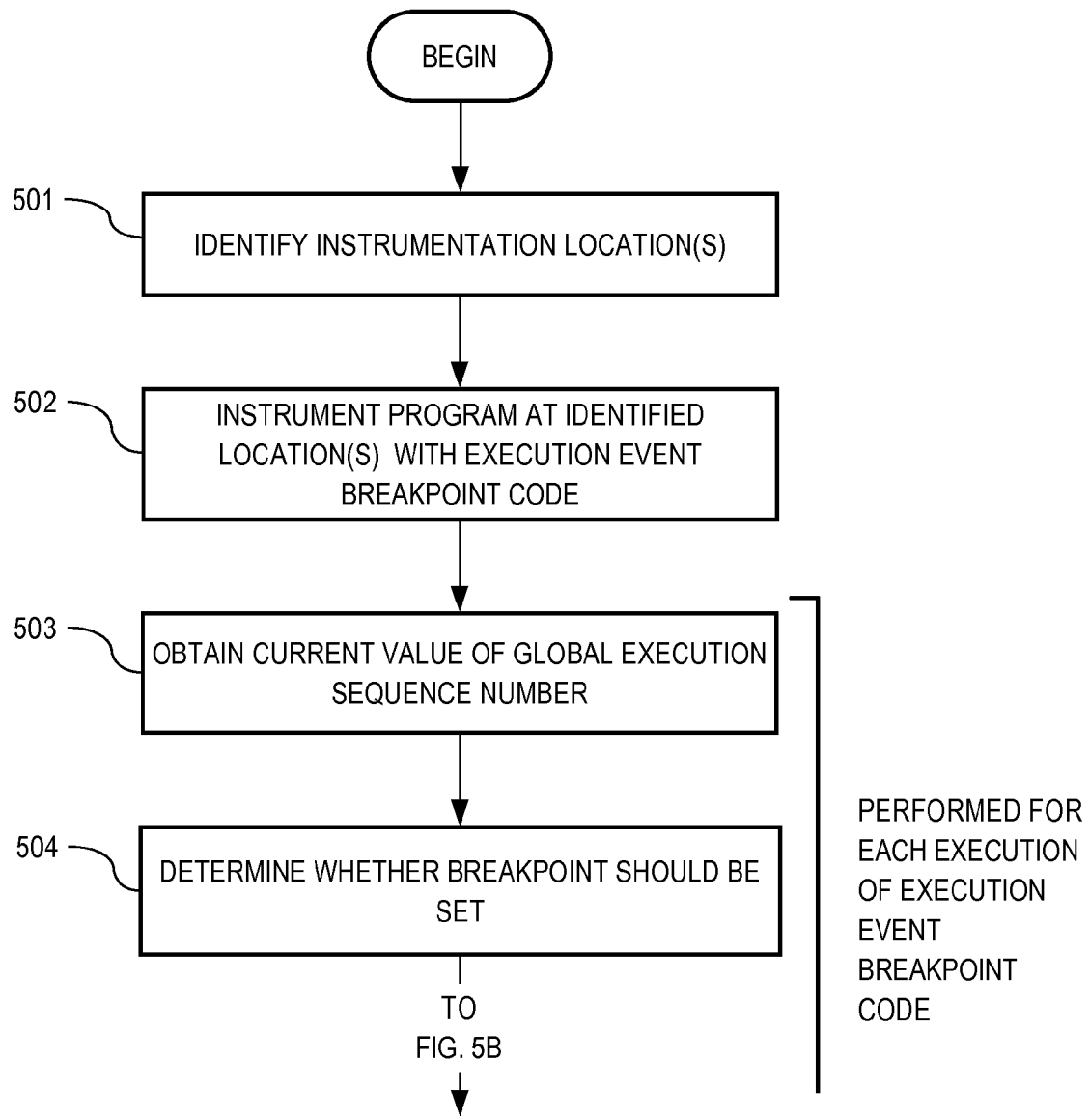

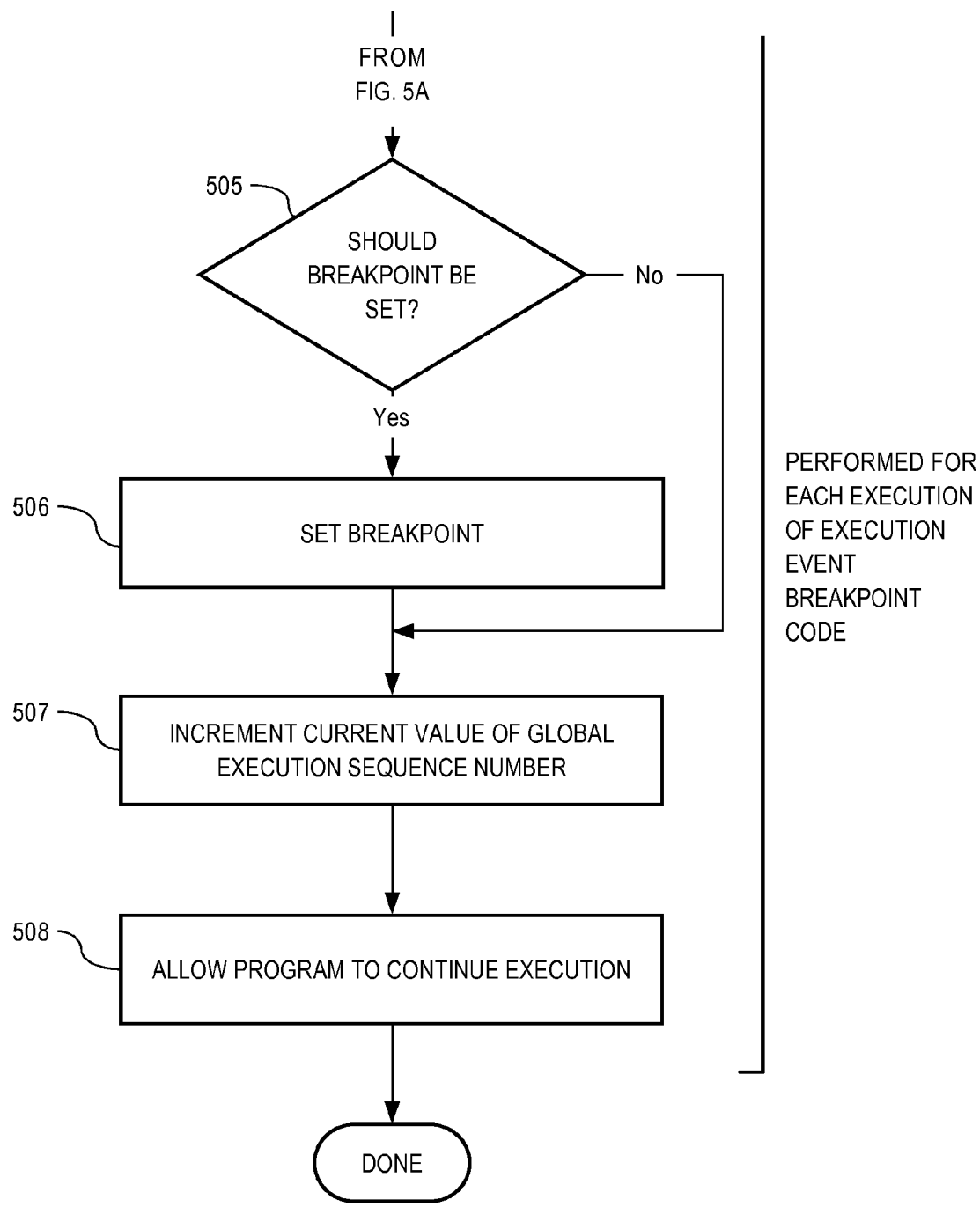

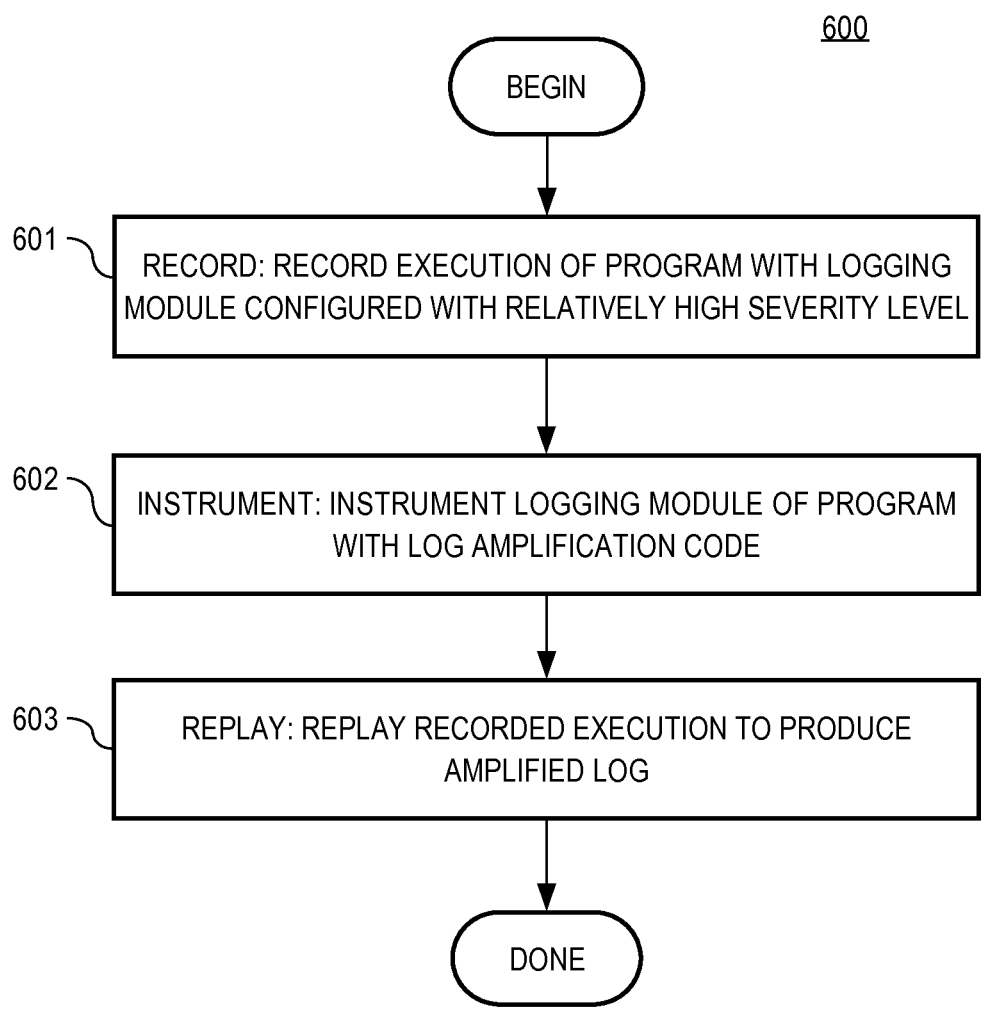

RECORDING AND REPLAYING COMPUTER PROGRAM EXECUTION WITH RECORDED EXECUTION EVENT BREAKPOINTS

TECHNICAL FIELD

The present invention relates generally to debugging software computer programs and, more particularly, to recording and replaying computer program execution with recorded execution event breakpoints.

BACKGROUND

Connected with the development of all but the most trivial of computer software programs is the need for debugging. Debugging refers to the process of detecting and removing defects or "bugs" from computer programs. In commercial software development, debugging often consumes considerable time, and may account for the largest time component in a development project. Traditional bug fixing requires detailed communication between testers and developers. Time is often wasted going back and forth between testers and developers trying to reproduce and isolate problems. Verifying that a bug has been fixed is error-prone and time consuming. Because fixing defects can be time-consuming and unpredictable, commercial software is frequently released with hundreds of open bug reports, release schedules are delayed while developers resolve open issues, and helpdesk tickets stay open while problems remain unresolved. Therefore, software developers are continually looking for ways to reduce the amount of time spent on debugging.

Conventional Debuggers

One tool commonly used to expedite debugging is a debugger computer program for locating defects in another computer program. Typically, a debugger operates by monitoring or observing an execution of a computer program. When the executing computer program generates an unrecoverable fault or exception caused by a defect or bug in the computer program, the debugger provides information about the state of the execution at the execution point the fault or exception occurred.

Some debuggers facilitate the setting of breakpoints. A breakpoint is a forced stop or pause (i.e., break) in the execution of a computer program being monitored or observed by the debugger. Typically, a debugger sets a breakpoint in a computer program by modifying or instrumenting the instructions of the computer program so that when a particular instruction is reached during execution, the execution is paused and control of the execution is transferred to the debugger. While the execution is paused and under control of the debugger, development or testing personnel can use the debugger to perform various investigative and debugging activities such as inspecting the state of the computer program, executing the computer program one instruction at a time (step-by-step), allowing program execution to continue to the next breakpoint, and setting new breakpoints.

To set a breakpoint with a debugger, typically the user of the debugger specifies a source code line number corresponding to an executable instruction of the computer program. For example, the source code line number may correspond to a particular function or sub-routine hypothesized to contain a defect. Each time the instruction is reached during execution of the program, which may be multiple times if the instruction is executed in a loop, the execution breaks at the instruction. However, if the instruction is executed in a loop, breaking execution of the program each time the instruction is executed can become tedious or impractical, especially if the defect occurs only after the Nth execution of the instruction where N is a relatively large number in the hundreds, thousands, or even millions.

Some debuggers allow users to set conditional instruction breakpoints. A conditional breakpoint is an instruction breakpoint but with a condition that is evaluated by the debugger each time the instruction is reached during execution of the program under test. With a conditional breakpoint, the execution of the program breaks at the breakpoint only if the condition associated with the breakpoint is met. Typically, conditions are expressed in the form of a Boolean expression on the state of program variables such as local and global variables.

Some debuggers allow users to set watchpoints. A watchpoint is similar to a conditional breakpoint except that a watchpoint is a condition associated with a program variable instead of a condition associated with a line number or instruction. Anytime during execution that the watched program variable changes to a state that satisfies the watchpoint condition, the debugger breaks the execution after the instruction causing the state change.

Computer Program Execution Record and Replay Systems

A computer program execution record and replay system records information about a program under test as the program executes, and provides reports about that information. Some systems facilitate replaying recorded program execution on a repeated basis. Using these computer execution record and replay systems, debugging is improved because defects are reproducible by replaying a particular recorded program execution session. A debugger may be used to observe and analyze the defects reproducible with these replay systems.

Often, a defect that occurs during recording of a program execution does not occur until many hours or even many days after the recording is started. For example, the program may be a complex server-based web application that serves many clients and is connected to multiple databases and that develops defects only under certain operating conditions such as a heavy client load. When debugging a recorded execution using a debugger and a replay system, it is desirable to be able to precisely break the replay execution at or near the point during the replay execution when a defect is reproduced.

One approach for breaking a replay execution using a breakpoint includes a user setting an instruction breakpoint, conditional breakpoint or watchpoint in the program using a debugging tool. However, these solutions are less than optimal. An instruction breakpoint is not optimal because the replay execution will break each time the instruction is executed, which may be hundreds, thousands, or millions of times before the defect is reproduced. Conditional breakpoints and watchpoints are not optimal because the user may not have sufficient information at hand about the state of program variables to formulate a condition that causes the replay execution to break at the precise moment. Therefore, a user is currently required to make a best guess as to an instruction breakpoint, conditional breakpoint, or watchpoint that will break the replay execution at the desired time. With the current approach, there is no effort to leverage the use of the record and replay system as a means to help facilitate the setting of breakpoints. At best, the current approach provides one with a tedious and time-consuming task.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A computer program execution record and replay system providing recorded execution event breakpoints is described. In one embodiment, for example, in the record and replay system, a method for providing recorded execution event breakpoints, the method comprising: recording information about one or more execution events that occur during a recorded execution of a computer program; during a replay execution of the computer program in which a particular execution event of the one or more execution events is faithfully reproduced, determining whether a breakpoint is to be set in the replay execution of the computer program based on the recorded information about the particular execution event; and if the breakpoint is to be set, then setting a breakpoint in the replay execution of the computer program such that the replay execution breaks at a point corresponding to the faithful reproduction of the particular execution event.

In another embodiment, for example, a data processing system providing a method for log amplification, the method comprising: instrumenting a logging module of a computer program with log amplification logic; during an execution of the computer program, the log amplification logic performing: receiving a log request, the log request specifying a severity level and a message; and in response to receiving the log request, comparing the severity level specified in the request with a log amplification severity level to determine whether the message should be logged.

In yet another embodiment, for example, a computer program execution record and replay system providing a method comprising: recording information about one or more execution events that occur during a recorded execution of a computer program; instrumenting a logging module of the computer program with log amplification logic; during a replay execution of the computer program instrumented with the log amplification logic in which a particular execution event of the one or more execution events is faithfully reproduced, receiving a log request, the log request specifying a severity level and a message; in response to receiving the log request, comparing the severity level specified in the request with a log amplification severity level to determine whether the message should be logged; determining whether a breakpoint should be set in the replay execution of the computer program based on the recorded information about the particular execution event; and if the breakpoint should be set, then setting a breakpoint in the replay execution of the computer program such that the replay execution breaks at a point corresponding to the faithful reproduction of the particular execution event.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates recording execution events during an original execution of a computer program using instrumented execution event capture code.

FIG. 5A and FIG. 5B illustrate setting a recorded execution event breakpoint using instrumented execution event breakpoint code during a replay execution of an original execution of a computer program.

FIG. 6 illustrates log amplification.

DETAILED DESCRIPTION

Introduction

In the following description, for the purposes of explanation, numerous specific details are set forth in order to provide a thorough understanding of the present invention. It will be apparent, however, that the present invention may be practiced without these specific details. Further, exemplary embodiments are described with reference to block diagrams or flowcharts. As to the block diagrams, well-known structures and devices are shown in block diagram form in order to avoid unnecessarily obscuring the present invention. As to the flowcharts, each block within the flowcharts represents both method step and an apparatus element for performing the method step. Depending on the implementation, the corresponding apparatus element may be configured in hardware, software, firmware, or combinations thereof.

Computer Program Execution Record and Replay System (Replay System)

Figure 1:
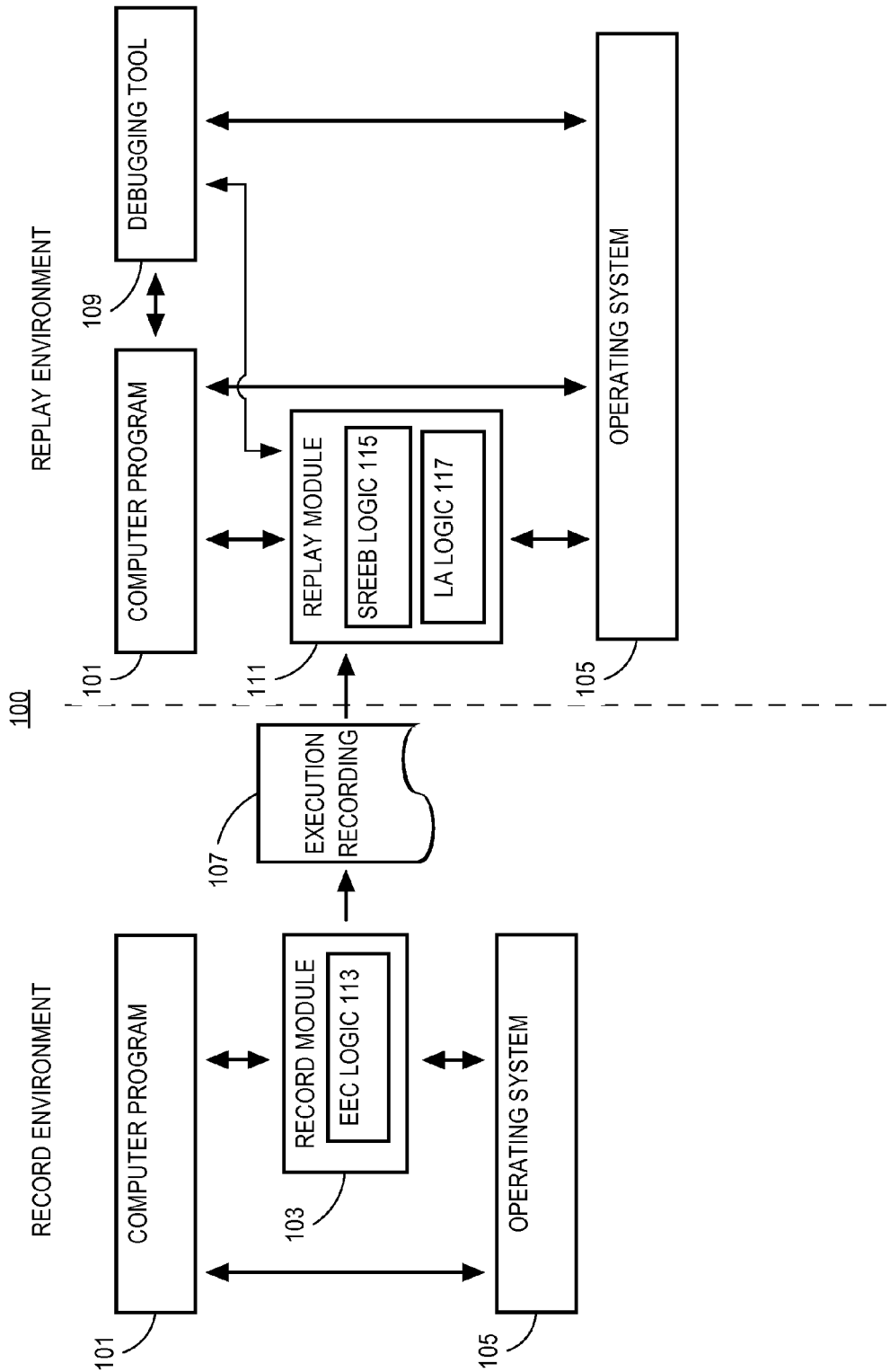
FIG. 1 illustrates a computer program execution record and replay system.

Embodiments may be embodied within a computer program execution record and replay system. FIG. 1 illustrates the general structure of a computer program execution record and replay system 100 suitable for implementing embodiments of the invention. In an exemplary embodiment, record and replay system 100 comprises Replay Director™ (available from Replay Solutions, Inc. of Redwood City, Calif.), running under a server operating system such as Microsoft® Windows from the Microsoft Corporation of Redmond, Wash., Solaris (Oracle), or Linux (RedHat). In an embodiment, system 100 may comprise a special-purpose computer or a general-purpose computer hosting one or more application programs that implement the functions herein.

As shown, the system 100 comprises the same software computer program 101 executing in two different operating environments: a record environment and a replay environment. The two environments correspond to a record mode and replay mode. In the record environment, information about an original execution of program 101 is recorded by computer program execution record module 103 as execution recording 107. In the replay environment, the original execution is re-executed (replayed) from the execution recording 107 by computer program execution replay module 111.

The record and replay operating environments may exist in separate physical environments. For example, the record environment may be within a computer system deployed in a data center or other production facility, while the replay environment may be within a lab computer system. While the two operating environments may exist in separate physical environments, physical separation of the two environments is not necessary. For example, both the record and replay environment may be within the same computer system.

In one embodiment, record and replay system 100 facilitates troubleshooting, problem analysis, and debugging of program 101. Record module 103 records information about input and events affecting the original execution of program 101 in the record environment. Replay module 111 provides the ability to replay the original execution including any defects, bugs, or events that occurred during the original execution.

In one embodiment, replay system 100 facilitates an efficient, fast method of detecting and eliminating bugs in computer programs. Redundant cycles in the bug fix workflow are eliminated. There is no need for back-and-forth communication between the tester and the developer to collect additional bug information. A tester can attach the execution recording 107 to a bug report e-mail message sent to a developer. The bug report and the execution recording 107 can provide all information that the developer needs to reproduce a bug found by the tester.

Record and replay system 100 operates by applying two computing principles. First, given the instructions of a computer program and all input to the computer program, the execution behavior of the computer program is deterministic—that is, the execution behavior of the computer program can be determined before the program is executed and provided that input. However, most modern computer programs are affected by nondeterministic inputs that cannot be readily determined ahead of their execution. Sources of nondeterministic input include external data input sources (e.g., user input, network data, data from data storage devices), certain system calls (e.g., a call to generate a random number or a call to get the current time of day), interrupts, traps, signals, non-initialized variables, dangling pointers, etc. For multi-threaded computer programs, sources of nondeterministic input additionally include unsynchronized accesses to shared memory (i.e. race conditions), the time at which thread context switches occur, the order in which critical sections are entered by waiting threads, etc.

Because a computer program may be affected by nondeterministic input, the behavior of the computer program may vary from execution to execution and the exact behavior of any particular execution cannot be readily predicted. This leads to the second computing principle applied by system 100, which is that if every nondeterministic input that affects a computer program's execution can be captured and recorded, this data can then be used to place the computer program into the same deterministic state in a future execution. In other words, if every nondeterministic input that may potentially influence the computer program is captured and fed back to the program during replay, the program will, according to the first principle, behave predictably and execute in the same fashion as it did during the recording.

In operation, record module 103 monitors or traces an original execution of program 101 in the record environment. During the original execution, record module 103 captures and stores information as execution recording 107 about the nondeterministic behavior of program 101 including information about nondeterministic input to program 101. The information stored as execution recording 107 is used by replay module 111 to guide a faithful re-execution (i.e., replay) of the original execution in the replay environment.

Generally, record module 103 accomplishes capturing and recording of nondeterministic input by programmatically inserting itself (or portion thereof) between the program 101 and the external data input sources that may potentially provide nondeterministic input to program 101. In this position, record module 103 intercepts, captures, and traps certain program 101 operations and data relating to the operations and stores the data as part of execution recording 107. The coupling or interface between program 101 and the operating system 105 on which program 101 executes provides a convenient "interception point" at which record module 103 can insert itself to intercept, capture, and trap nondeterministic input to program 101.

In one embodiment, record module 103 inserts itself between program 101 and operating system 105 through programmatic instrumentation of program 101. As used herein, the term "instrument" refers broadly to programmatically adding processor-executable instructions to existing processor-executable instructions such that the added instructions are capable of being executed along with the existing instructions. In one embodiment, the instrumented code added to program 101 by record module 103 performs intercepting, capturing, and trapping of nondeterministic input and storing of information about nondeterministic input as execution recording 107. Instrumented code may be added to program 101 at strategic points in the program where nondeterministic input may be expected. Generally, the strategic points correspond to locations in program 101 where certain system calls to the operating system 105 are made and where asynchronous callbacks from the operating system 105 into the program 101 are received. These locations can be programmatically identified by record module 103 through inspection of the instructions of program 101 before or at the time the instructions are loaded for execution.

The specific inspection technique employed depends on the type of instructions of program 101. For example, where program 101 contains binary instructions, record module 103 might disassemble the binary instructions to identify the strategic locations. Alternatively, when program 101 comprises bytecode executable by a virtual machine or interpreter, record module 103 might invoke an API (Application Programming Interface) provided by the virtual machine or interpreter such as, for example, the JAVA Virtual Machine Tools Interface API (JVMTI) available for most JAVA Virtual Machines. Other inspection techniques may be used and embodiments of the invention are not limited to any particular inspection technique.

Similarly, the specific instrumentation technique employed may depend on the type of instructions of program 101. For example, where program 101 comprises bytecode or other intermediate-level processor instructions, record module 103 might use a bytecode instrumentation library or API such as, for example, the JAVA ByteCode Instrumentation API (JAVA BCI) for instrumenting JAVA bytecode. Other instrumentation techniques may be used and embodiments of the invention are not limited to any particular instrumentation technique.

In another embodiment that is not exclusive of instrumenting program 101, a portion of record module 103 is a stand-alone process or a shared library or module executing as part of program 101 that receives notification of events that occur during the original execution of program 101. Information received in these notifications may be used to manage the original execution and may be stored as part of execution recording 107 to facilitate replay. Notifications may be received through a well-defined API such as, for example, the JVMTI for JAVA programs. Non-limiting examples of the types of events for which notifications may be received include class loading events, thread start and end events, and mutex contention events.

Generally, replay module 111 guides a faithful replay of the original execution from the execution recording 107. To replay the original execution, the program 101 is executed in the replay environment and replay module 111 substitutes information from the execution recording 107 for nondeterministic inputs that are associated with the original execution. Substituting information for nondeterministic inputs may include instrumenting program 101 in the replay environment similar to how program 101 was instrumented in the record environment except that the instrumentation code, instead of capturing and storing nondeterministic input, provides recorded input from execution recording 107 to program 101 in substitute for "actual" nondeterministic input from the operating system 105 in the replay environment. In this way, replay module 111 can be said to "virtualize" the external data input sources that were present in the record environment during the original execution. Like record module 103, a portion of replay module 111 may be a stand-alone process or a shared library or module executing as part of program 101 in the replay environment that receives notification of events that occur during the replay execution of program 101.

In one embodiment, the operating systems 105 in both the replay environment and the record environment are the same type, version, or family of operating system. For example, in one embodiment, the operating systems 105 in both the replay environment and the record environment are from the Microsoft® Windows family of operating systems. However, embodiments of the invention are not limited to the same type, version or family of operating system in both the replay and record environments, and embodiments of the invention may have different types, versions, or families of operating systems in the record and replay environments. For example, the operating system 105 in the record environment may be a Microsoft Windows® operating system and the operating system 105 in the replay environment may be a Unix or Linux based operating system.

Computer program 101 is a set of processor-executable instructions. The processor may be a hardware-based processor such as a central processing unit of a computer (or a software-based emulation thereof) that implements a machine instruction set such as, for example, the Intel x86 instruction set. In this case, the set of instructions may comprise machine, native, or binary instructions, which can be disassembled into assembly instructions. A non-limiting example of a program 101 comprising binary instructions is a binary executable version of a game program developed for a computer gaming platform such as, for example, the Microsoft® XBOX game platform. Alternatively, the processor may be an interpreter or virtual machine that implements a higher-level instruction set such as, for example, JAVA bytecode. In this case, program 101 comprises bytecode instructions or other intermediate language instructions capable of being interpreted, processed, and executed by a virtual machine or interpreter such as, for example, a JAVA Virtual Machine. A non-limiting example of a program 101 comprising bytecode instructions is a JAVA application developed for a JAVA Application Server platform such as, for example, Tomcat, JBoss, WebLogic, etc. In addition to instructions from static libraries compiled to form program 101, the set of instructions comprising program 101 may include instructions that are dynamically loaded, linked, and executed from a dynamic link library (DLL) or other shared library that can be incorporated into program 101 at load-time or runtime.

For any given execution of program 101, instructions of program 101 are executed in a particular sequence. The sequence in which instructions of program 101 are executed may vary from execution to execution depending on nondeterministic factors such as, for example, user input, network input, thread context switching, etc. When program 101 is originally executed in the record environment, record module 103 captures and stores sufficient information about the original execution so that the instruction execution sequence of the original execution can be faithfully reproduced during replay.

In one embodiment in which program 101 is a multithreaded program, record module 103 and replay module 111 manage the original and replay execution of program 101 respectively to ensure that the original instruction execution sequence is accurately reproduced during replay. In particular, record module 103 manages the original execution of program 101 such that only one thread of program 101 executes instructions of program 101 at a time. Record module 103 records as part of execution recording 107 the order in which threads of program 101 execute instructions of program 101. This order information is used by replay module 111 to ensure that the threads of program 101 execute instructions of program 101 in the same order as during the original execution.

In one embodiment, a single program-level mutex or lock is used by both record module 103 and replay module 111 to ensure that only one thread of program 101 executes instructions of program 101 at a time. The order information recorded by record module 103 as part of execution recording 107 comprises information about the order in which threads of program 101 acquire the single program-level mutex. Replay module 111 uses the order information to ensure that threads of program 101 acquire the single program-level mutex or lock in the same order as they did during the original execution. Other techniques may be used by system 100 to ensure that the original instruction execution sequence is reproduced during replay and embodiments of the invention are not limited to the techniques described herein.

In the replay environment, a conventional debugging tool 109 (debugger) may be used to observe, monitor, and debug the replay execution of program 101. Debugger 109 may be a conventional debugger suitable for debugging program 101. Non-limiting examples of commercial and open-source debugging tools that are suitable for use as debugger 109 include the Eclipse IDE (Integrated Development Environment) currently available under a public license from http://www.eclipse.org and the Microsoft Visual Studio Debugger available from the Microsoft Corporation of Redmond, Wash. In another embodiment, replay module 111 is a component of or add-on to a debugger 109 providing conventional debugging functionality. Thus, while FIG. 1 depicts replay module 111 as a module separate from debugging tool 109, it should be understood that the present invention is not so limited.

The above-described record and replay system is presented for the purposes of illustrating the basic underlying system components that may be employed for implementing embodiments of the invention. For purposes of discussion, the following description will present examples in the context of record and replay system 100 of FIG. 1. The present invention, however, it not limited to the record and replay system 100 of FIG. 1. Instead, embodiments of the present invention may be implemented in any type of record and replay system or processing environment capable of supporting the embodiments presented in detail below.

In embodiments described in greater detail below, record module 103 comprises execution event capture logic 113 for capturing and storing information about one or execution events that occur during a recorded execution of program 101 in the record environment. Replay module 111 comprises set recorded execution event breakpoint logic 115 for automatically setting a breakpoint in a replay execution of program 101 such that the replay execution breaks precisely at point corresponding to a faithful reproduction of recorded execution event of interest. Replay module 111 may also comprises log amplification logic 117 for generating verbose or trace logging during a replay execution of program 101 where program 101, when recorded, was not configured to generate verbose logging.

Recorded Execution Event Breakpoints—Overview

In accordance with an embodiment of the invention, a breakpoint (e.g., an instruction or conditional breakpoint) is automatically and programmatically set in a computer program by a replay module during a replay execution of the computer program. In particular, the breakpoint is set such that the replay execution breaks at a precise moment corresponding to a particular execution event of interest (e.g., a particular log write operation) that occurred during the original recorded execution of the program and that has been reproduced during the replay execution.

To facilitate setting the breakpoint, data associated with a sequence of execution events occurring during the original execution is captured and stored by a record module as execution event elements in an execution recording of the original execution. Each execution event element corresponds to a particular execution event that occurred in sequence during the original execution. In general, every time an instruction of the computer program is executed, an execution event occurs. However, not all instructions of the computer program generate interesting execution events. Therefore, in a practical embodiment, data is captured and stored as an execution event element only when certain selected instructions of the computer program are executed. Examples include instructions corresponding to calls to certain subroutines of the computer program, certain exception handling instructions, and certain event handling instructions.

In one embodiment, each execution event element comprises an execution sequence number and program data (e.g., function arguments) associated with the execution event. To capture this data, the record module instruments the program with execution event capture code at strategic locations such as for example inside certain functions or sub-routines (e.g., inside logging functions or database access functions).

Once the execution recording has been made, an end-user (e.g., a software developer or tester) identifies to the replay module a particular execution event of interest at which a replay execution should break. Such identification may be accomplished, for example, by using a user interface of a debugger or the replay module that allows the end-user to browse or search recorded execution event elements to locate an execution event of interest.

For the replay execution, the program is instrumented with execution event breakpoint code at the same strategic locations at which the program was instrumented for the original execution with execution event capture code. Since replay of the program from the execution recording is deterministic, the order in which execution event breakpoint code is executed during replay will not deviate from the order in which execution event capture code was executed during record. A replay execution sequence number is maintained by the replay module during replay execution that is comparable to the execution sequence numbers associated with recorded execution event elements. When execution event breakpoint code is reached during replay that corresponds to the execution sequence number of the particular execution event of interest, the execution event breakpoint code sets an instruction breakpoint at an instruction of the program following the execution event breakpoint code (e.g., at the first instruction of the program following the execution event breakpoint code) and allows replay execution to continue. When the instruction breakpoint is reached, the replay execution pauses at which point a debugger can be used to inspect the state of the computer program at the recorded execution event. Therefore, with the underlying functionality provided by the system of the present invention, a developer or tester replaying a program defect using a record and replay system (e.g., system 100 of FIG. 1) can precisely set a breakpoint corresponding to a particular recorded execution event of interest.

Example Execution Recording Format

Figure 2:
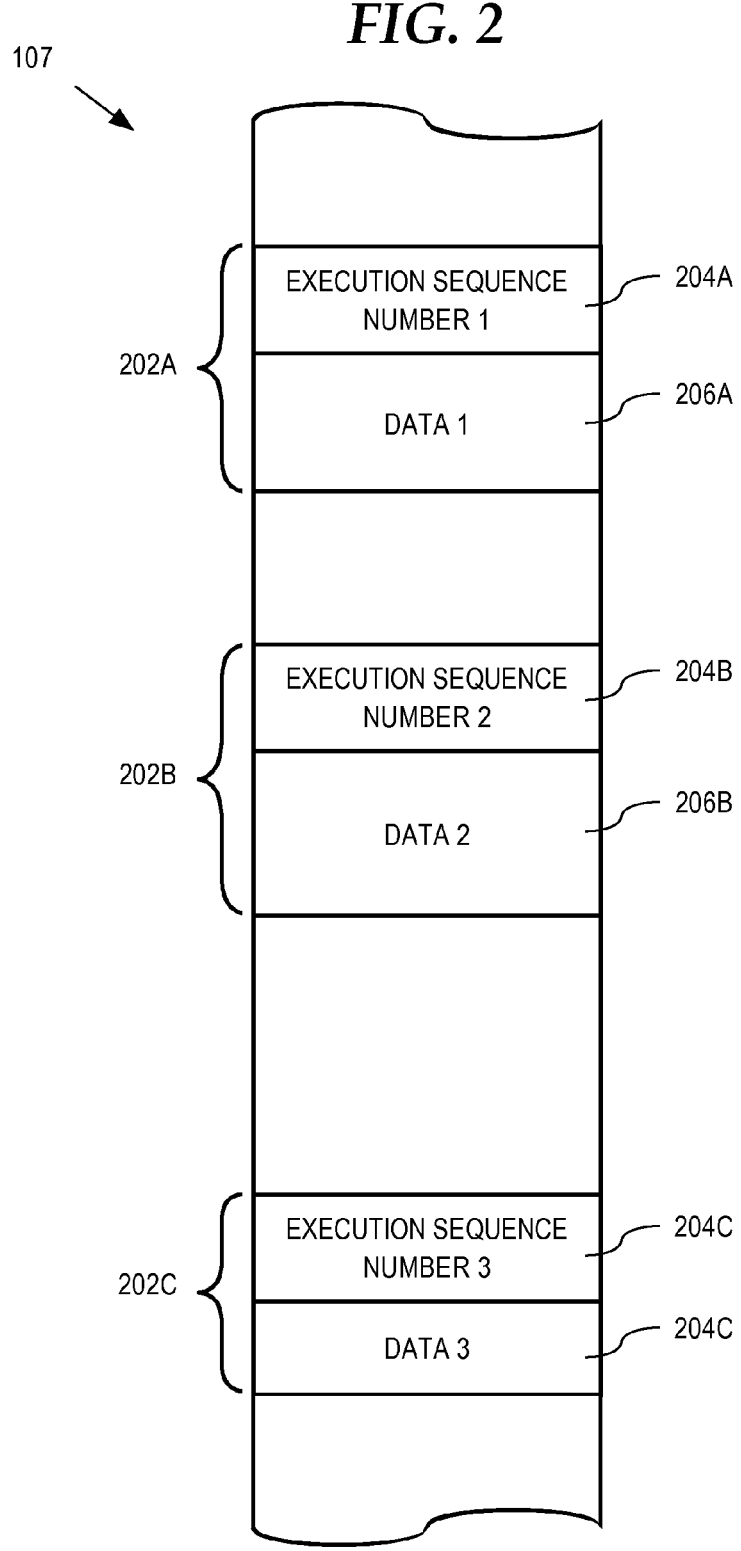
FIG. 2 illustrates an example data format that can be used by record module for configuring a memory or storage device and storing in the memory or storage device an execution recording including execution event elements that are generated as part of recording a computer program.

FIG. 2 illustrates an example data format that can be used by record module 103 for configuring a memory or storage device and storing, in the memory or storage device execution, a recording 107 including execution event elements that are generated as part of recording computer program 101. In one embodiment, execution recording 107 consists of one or more data files stored in a computer filesystem.

In one embodiment, an execution recording 107 comprises a plurality of execution event elements 202A, 202B, 202C, etc. Each execution event element includes an execution sequence element number element followed by an associated data element. For example, execution event element 202A comprises execution sequence number element 204A and data element 206A.

In an embodiment, each execution sequence number element 204A, 204B, 204C, etc. is fixed size. Each of the data elements 206A, 206B, 206C, etc. is variable in size. Each of the execution sequence number elements 204A, 204B, 204C, etc. relates to a sequence of execution events that occurred during the original execution of program 101. Each data element 206A, 206B, 206C, etc. has a unique execution sequence number 204A, 204B, 204C, etc. associated with it. Execution sequence numbers 204A, 204B, 204C, etc. typically are sequenced and carry values that increment by one linearly for each data element 206A, 206B, 206C, etc. that is recorded. The execution sequence numbers 204A, 204B, 204C, etc. are used by replay module 111 during replay execution for determining when and where a breakpoint should be set.

Each data element 206A, 206B, 206C, etc. relates to an execution event that occurred during recording. During the original execution, data in a data element is collected by execution event capture code and written to the execution recording 107 with an execution sequence number. Data in a data element may be used by an end-user to identify a particular execution event of interest at which a breakpoint is to be set during replay execution. For example, data in a data element may include such information as a date/time associated with the execution event and values of selected program variables such as, for example, values of function arguments of a function instrumented with execution event capture code. During replay execution, an execution sequence number element is read from the execution recording 107 and the execution sequence number element is compared with a replay execution sequence number to determine whether an execution event has been reached at which a breakpoint is to be set.

In one embodiment, in addition to information relating to a sequence of execution events, execution recording 107 contains information relating to the sequence of nondeterministic input to program 101 during the original execution. The execution recording 107 may comprise nondeterministic input elements like execution event elements 202A, 202B, 202C, etc., each including an execution sequence number element and a data element. Each of the data elements of the nondeterministic input elements relates to a nondeterministic event that occurred during recording. During recording, data in a data element of nondeterministic input element is collected and written to the execution recording 107 with an execution sequence number. During replay mode, a data element of a nondeterministic input element is read from the execution recording 107 and the data element provides the nondeterministic input back to program 101.

In one embodiment, an execution event element 202A, 202B, 202C, etc. relates to both an execution event during the original execution at which a breakpoint may be set during replay and to non-deterministic input to program 101 during the original execution. Thus, an execution event elements 202A, 202B, 202C, etc. can also serve as a non-deterministic input element.

Further, while example embodiments above describe non-deterministic input elements and execution event elements in the same execution recording data, it will be apparent that non-deterministic input elements can be captured and stored separately from execution event elements. Thus, in one embodiment, execution recording 107 comprises two separate sets of data: one set comprising a sequence of non-deterministic input elements and the other set comprising a sequence of execution event elements. Further, it will be apparent that the sequence of non-deterministic input elements can be assigned execution sequence numbers independently of the execution sequence numbers assigned to the sequence of execution event elements. Alternatively, non-deterministic input elements and execution event elements can be sequenced together.

System Components

Figure 3:
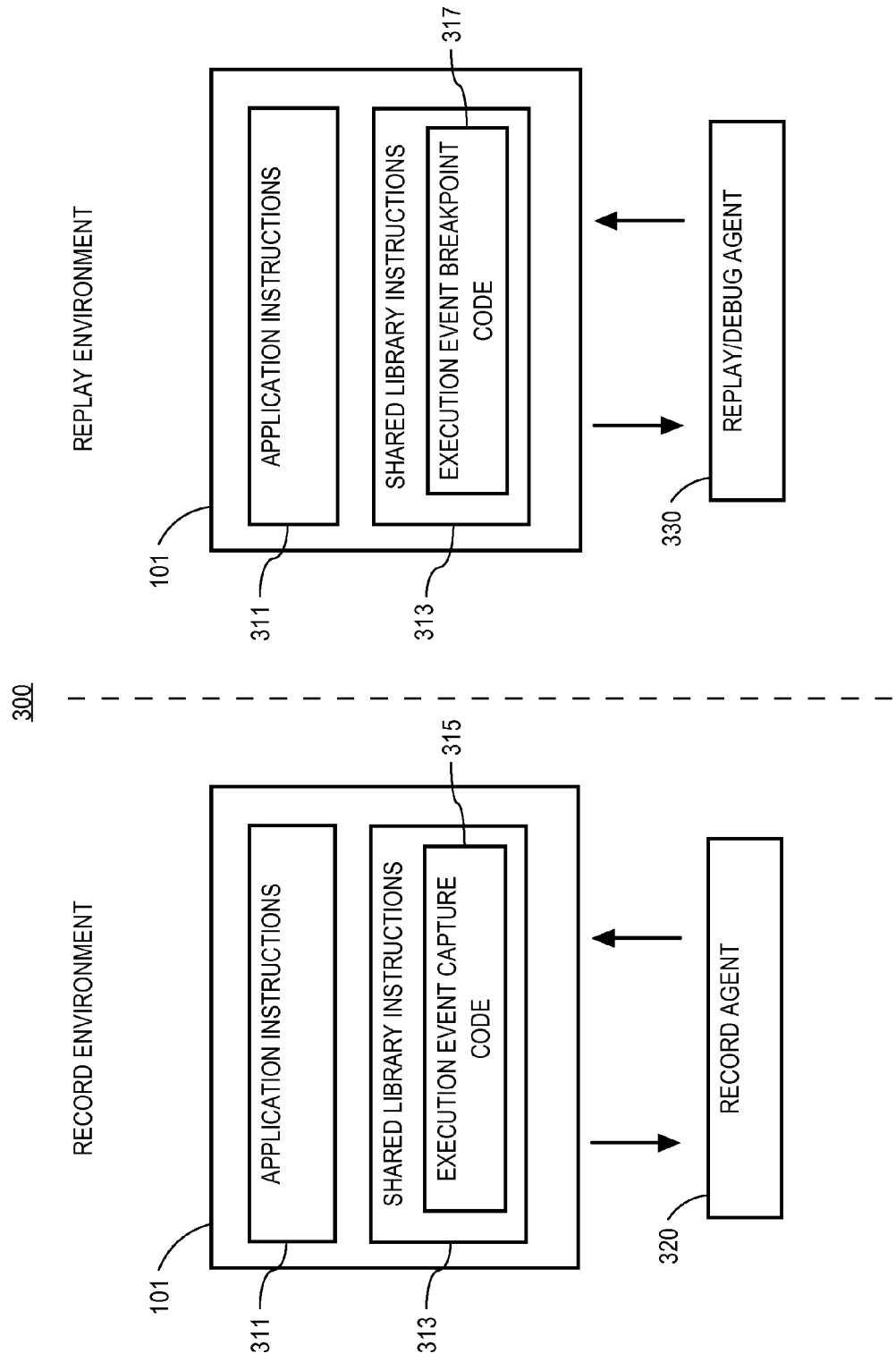
FIG. 3 illustrates a record and replay system environment.

FIG. 3 illustrates a record and replay system environment 300. As shown, the environment 300 includes a record environment and a replay environment. In the record environment and replay environment, computer program 101 includes application instructions 311 and shared library instructions 313. Depending on the type of program 101, instructions 311 and 313 are either binary instructions (e.g., x86 processor instructions) if program 101 is a binary executable program or bytecode instructions (e.g., JAVA bytecode) if program 101 is a virtual machine executable program or interpreted program.

Application instructions 311 represent instructions developed or coded by a developer of program 101. For example, application instructions 311 may implement the core business logic of program 101. Shared library instructions 313 represent instructions included as part of system, standard or shared libraries that are statically or dynamically linked with application instructions 311 and that execute as part of program 101. For example, shared library instructions 313 may represent instructions of an "off the shelf" logging library, database access library, network library, etc.

Record agent 320 represents any logic or program capable of instrumenting program 101 in the record environment with execution event capture code 315. Both execution event capture code 315 and record agent 320 are components of record module 103. Similarly, replay/debug agent 330 represents any logic or program capable of instrumenting program 101 in the replay environment with execution event breakpoint code 317. In one embodiment, replay/debug agent 330 is a component of a conventional debugging tool. Both execution event breakpoint code 317 and replay/debug agent 330 are components of replay module 111.

In one embodiment, the record agent 320 instruments shared library instructions 313 of program 101 with execution event capture code 315 at selected locations in program 101. The selected locations may be pre-defined or pre-established ahead of the instrumentation. In one embodiment, the selected locations correspond to shared library subroutines where interesting execution events typically occur. For example, the selected locations may correspond to logging subroutines, database access subroutines, or other frequently invoked shared library subroutines. As used herein, the term "subroutine" refers generally to a named or addressable sequence of processor-executable instructions within a computer program that, when executed, performs a specific task or action. Typically, a subroutine is "called" multiple times and from several locations during an execution of the program, including from other subroutines. A subroutine may accept input in the form of arguments or parameters to customize the task performed by the subroutine. Often, a subroutine provides output in the form of a return value or by modifying argument data passed into the subroutine or by modifying global or shared data. In computer programs developed using an object-oriented programming language such as a JAVA, subroutines may be encapsulated within classes or objects or other programming structures. Subroutines may also be referred to herein as "procedures", "methods", "functions", or just "routines".

In one embodiment, to instrument a selected shared library subroutine, record agent 320 locates the subroutine in shared library instructions 313 before the subroutine is executed for the first time in the record environment. Once located, record agent 320 instruments the subroutine with execution event capture code 315 such that the execution event capture code 315 is executed before any instructions that were originally part of the subroutine. At this location, the execution event capture code 315 can capture or intercept, for example, the values of function arguments passed to the subroutine and store the captured data as part of execution recording 107.

In the replay environment, replay/debug agent 330 instruments program 101 with execution event breakpoint code 317 at the same or equivalent locations at which program 101 was instrumented with execution event capture code 315 by record agent 320 in the record environment. The locations may be well-known or pre-established ahead of the instrumentation by record/debug agent 330.

Execution Event Capture Code

As mentioned, during record, program 101 is instrumented at various strategic locations by record module 103 with execution event capture code 315. During the original execution of program 101, execution event capture code 315 is executed as part of executing program 101. A function of execution event capture code 315 is to capture and record information about an execution event occurring when the capture code 315 is being executed. The recorded information is used by a developer or tester during replay execution to identify an execution event of interest.

At a high level, execution event capture code 315 obtains or generates a current execution sequence number and data about a current execution state of program 101 such as, for example, values of certain program stack variables, heap variable, and/or function arguments. The current execution sequence number and data are stored as an execution event element 202A, 202B, 202C, etc. in execution recording 107. In one embodiment, record module 103 maintains the current execution sequence number as a global variable of program 101 where it is accessible by execution event capture code 315. The global variable carries a value that increments by one linearly for each captured execution event. Thus, each recorded execution event may be associated in execution recording 107 with a unique execution sequence number and the execution sequence numbers associated with recorded execution events provide a total ordering of all recorded execution events.

In one embodiment, execution event capture code 315 varies depending on the particular shared library subroutine that is instrumented to include the execution event capture code 315. In particular, execution event capture instructions 315 can perform functions specific to the instrumented subroutine. For example, execution event capture instructions 315 of a logging subroutine may perform different functions and operations from execution event capture instructions 315 of a database access subroutine.

As described in greater detail below, in one embodiment, execution event capture code 315 of selected logging subroutines are used to achieve in effect a form of log data amplification during replay execution such that a relatively low logging level (e.g., ERROR) may be maintained during record to save computing resources in the record environment, but in the replay environment, a logging level is set to a relatively higher level (e.g., DEBUG) to capture all the log messages that would have been generated in the record environment had the logging level been at the relatively higher level. In this way, the program can operate in a production environment without the undesirable performance overhead caused by verbose logging, yet should a defect develop with the program the program can be replayed in a replay environment with verbose logging capabilities to aid in diagnosing and resolving the defect.

In one embodiment in which program 101 is a multi-threaded computer program, record module 103 manages threads of program 101 during the original execution to avoid unsynchronized access to shared program state by execution event capture code. Such management may involve use of a single-program level mutex that threads of program 101 are forced to acquire by record module 103 before executing instructions of program 101 including any instrumented execution event capture code.

The embodiment depicted in FIG. 3 shows only shared library instructions 315 being instrumented with execution event capture code 315. However, in other embodiments, application instructions 311 may also be instrumented with execution event capture code 315. Alternatively, only application instructions 311 may be instrumented with execution event capture code 315. Thus, the example embodiment of FIG. 3 should not be construed as limiting other embodiments of the invention to only instrumentation of shared library instructions 313 with execution event capture code 315.

Execution Event Breakpoint Code

As mentioned, during replay execution, program 101 is instrumented with execution event breakpoint code 317 by replay module 111 at the same or equivalent locations program 101 was instrumented during record with execution event capture code 315 by record module 103. During the replay execution of program 101, execution event breakpoint code 317 is executed as part of replaying the original execution of program 101 from execution recording 107. By virtue of the faithful replay of the original execution of program 101 by replay module 111 from the execution recording 107, the order in which execution event breakpoint code 317 is executed during replay will not deviate from the order in which execution event capture code 315 was executed during record.

A function of execution event breakpoint code 317 is to determine whether an execution event has been reached during replay execution at which a breakpoint is to be set. In one embodiment, during replay execution, a current execution sequence number and a list of execution sequence numbers at which breakpoints are to be set are maintained as one or more variables by replay module 111. Execution event breakpoint code 317, when executed as part of the replay execution, compares the current execution sequence number against the list of execution sequence numbers to determine if an execution event has been reached at which a breakpoint is to be set. If an execution event has been reached at which a breakpoint is to be set, then the execution event breakpoint code 317 sets a breakpoint at an instruction of the program 101 following the location of the execution event breakpoint code 317 in the program 101. For example, the execution event breakpoint code 317 may set a breakpoint at the first instruction of program 101 following the location of the execution event breakpoint code 317. In one embodiment, to set the breakpoint, the execution event breakpoint code 317 invokes an API facilitating the setting of breakpoints at an instruction of program 101. One example of such an API is the SetBreakpoint function of JVMTI API for setting breakpoints at an instruction of a specified subroutine of a JAVA program. The subroutine signature of the JVMTI API SetBreakpoint function is as follows:

jvmtiError
SetBreakpoint(jvmtiEnv* env,
   jmethodID method,
   jlocation location)

After setting a breakpoint, the execution event breakpoint code 317 allows the replay execution of program 101 to continue. When the instruction is reached, the breakpoint is activated and the replay execution pauses. At this point, a user can use debugger 109 to inspect the state of the program 101.

Methodology for Setting Recorded Execution Event Breakpoints

Figure 7:
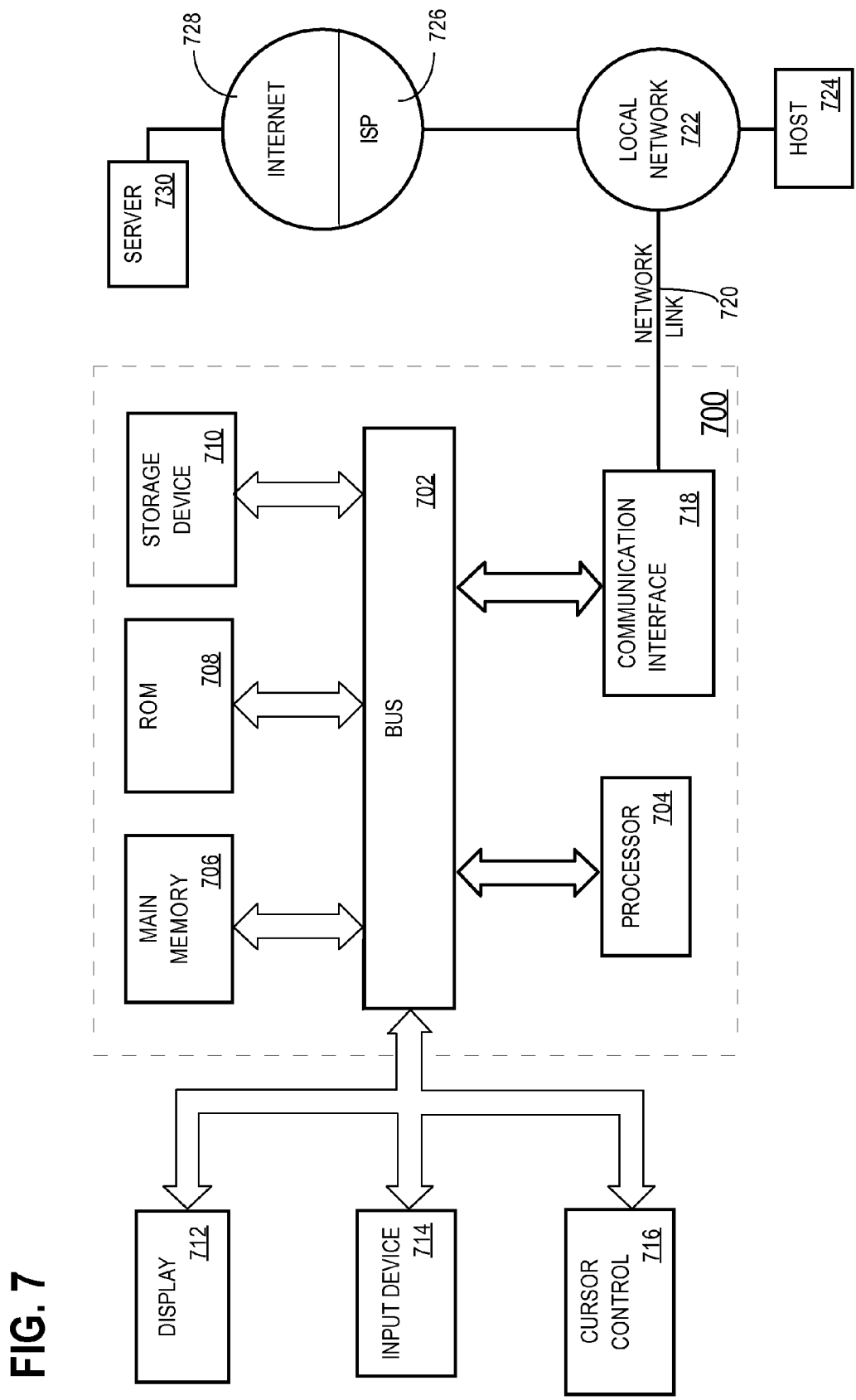
FIG. 7 illustrates a computer system upon which an embodiment may be implemented.

The following description presents steps of methods that may be implemented using processor-executable instructions for directing operation of one or more computing devices under processor control such as, for example, the computer system of FIG. 7.

FIG. 4 comprises a flowchart 400 illustrating recording execution events during an original execution of a computer program using instrumented execution event capture code. FIG. 5A and FIG. 5B comprise a flowchart 500 illustrating setting a recorded execution event breakpoint using instrumented execution event breakpoint code during a replay execution of the original execution of the computer program. In one embodiment, the methodology of flowchart 400 is performed by record module 103 in the record environment of FIG. 1 and the methodology of flowchart 500 is performed by replay module 111 in the replay environment of FIG. 1. However, the methodologies of flowcharts 400 and 500 may be implemented in any type of record and replay system or processing environment capable of supporting the methodologies as presented in detail below.

Record Methodology

Turning first to the methodology illustrated by FIG. 4, the methodology is performed in the context of recording an original execution of a computer program using a record and replay system such as record and replay system 100 of FIG. 1. In one embodiment, the methodology of flowchart 400 is performed by record module 103 in the record environment of FIG. 1. At the outset, one or more locations in the computer program for instrumenting with execution event capture code are identified, as indicated at step 401. Identification of instrumentation locations can occur statically before the program is executed, dynamically while the program is being executed, or both statically and dynamically. In one embodiment not exclusive of static identification of instrumentation locations, dynamic identification of instrumentation locations is performed as instructions of the computer program are being loaded for execution.

In one embodiment, identification of instrumentation locations is based on a pre-established set of subroutines. Either through static or dynamic identification, the instructions of the computer program are inspected for instructions implementing any of the pre-established subroutines. Any technique known in the art for inspecting the instructions of the computer program for instructions implementing a subroutine may be used. The pre-established set of subroutines can include virtually any subroutines of the computer program. In a practical embodiment, the pre-established set of subroutines includes one or more subroutines of the computer program in which information about interesting execution events is obtainable by execution event capture code. For example, if the computer program uses a standard logging library by which information about error or other execution anomalies are outputted, then information about interesting execution events may be obtained in subroutines of the logging library for outputting information to be logged. The information to be logged, for example, a log message containing a description of an error, may include useful information about an interesting execution event.

As mentioned, in one embodiment, each instrumentation location corresponds to a particular subroutine of the computer program. In one such embodiment, the instrumentation location is before the first instruction of a subroutine such that the execution event capture code added at the instrumentation location is executed every time the subroutine is called before the first instruction of the subroutine. Other instrumentation locations are possible and embodiments of the invention of not limited to only instrumentation locations corresponding to particular subroutines or limited to locations before the first instruction of a subroutine.

Once the instrumentation locations are identified, the computer program is instrumented at the identified locations with execution event capture code, at step 402. Instrumentation may occur statically before the program is executed, dynamically as instructions of the program are loaded for execution or both statically and dynamically. Any technique known in the art for instrumenting processor-executable instructions of a computer program may be used. It is expected that the specific technique used to instrument the computer program will vary depending on the type of processor-executable instructions of the computer program. For example, if the computer program comprises binary instructions, then a binary instrumentation technique might be used. On the other hand, if the computer program comprises, for example, bytecode instructions or other intermediate-level executable instructions, then a bytecode instrumentation technique might be used.

After steps 401 and 402 are performed for a particular instrumentation location, whenever the location is reached during the execution of the computer program, the execution event capture code instrumented at the location is executed to capture and record information about an execution event. Steps 403-406 are performed to capture and record information about an execution event each time execution event capture code instrumented at a location is executed. Steps 403-406 are described herein in the context of an execution of execution event capture code instrumented at a location of the computer program.

At step 403, the execution event capture code obtains the current value of the global execution sequence number. In one embodiment, the current value of the global execution sequence number is maintained by the record module as a global variable of the computer program where it is accessible by execution event capture code. A purpose of the global execution sequence number is to provide a unique identifier for each execution event recorded by execution event capture code. Another purpose of the global execution sequence number is to provide a total ordering of all recorded execution events in order of their occurrence during the original execution of the computer program.

At step 404, the execution event capture code obtains execution event data pertaining to an execution event to be captured. This execution event data will be associated in an execution recording with the current value of the global execution sequence number obtained in step 403. In general, the execution event data comprises information about a state of the execution of the computer program when the execution event capture code is executed. In one embodiment, the obtained execution event data comprises one or more of current values local variables (e.g., stack variables), values of current function arguments (which may also be local variables), and current values of global variables of the computer program. The execution event data that is captured may vary depending on the particular execution event capture code that is being executed. Thus, the functionality of execution event capture code may vary between different instances of execution event capture code. For example, one instance of execution event capture code may capture only values of certain function arguments passed into a subroutine while another instance of execution event capture code may capture only the current value of a particular global variable. In addition to information about program variables, execution event capture code may also generate metadata to be stored along with captured execution event data in the execution recording. Such metadata may include, for example, a current date/time, the name of the currently called subroutine, and an identifier or classification of the type of execution event.

At step 405, the execution event capture code records the current value of the global execution sequence number along with the captured execution event data and any associated metadata in the execution recording. For example, referring again to FIG. 2, the current value of the global execution sequence number may be stored in execution recording 107 as an execution sequence number element (e.g., 204A) followed by a data element comprising the capture executed event data and associated metadata (e.g., 206A).

At step 406, the current value of the global execution sequence number is incremented by the execution event capture code so that the next execution event capture code that executes records at step 405 a unique in-sequence execution sequence number. Alternatively, step 406 may be performed by the execution event code after step 403 but before step 405.

Once the execution event capture code has completed execution the instructions of the computer program following the execution event capture code are allowed to execute until the next execution event capture code is reached. This process repeats until the recording of the computer program is stopped. Once a recording of an execution of the computer program has been made, the recording may be sent to a developer or tester for replaying the recording. For example, test personnel can attach the execution recording for a portion of the computer program that contains a bug or defect to a bug report and send the bug report to a developer.

Replay Methodology

Turning next to the methodology illustrated by FIG. 5, the methodology is performed in the context of replaying the original execution of the computer program using a record and replay system such as record and replay system 100 of FIG. 1. In one embodiment, the methodology of flowchart 500 is performed by replay module 111 in the replay environment of FIG. 1.

The methodology of flowchart 500 is performed in the context of a replay execution of a recorded execution of a computer program. During the replay execution, one or more execution events that occurred during the recorded execution are faithfully reproduced. The replay execution may be monitored or observed by a conventional debugging tool. The methodology of flowchart 500 facilitates automatic and programmatic setting of a breakpoint in the replay execution of the computer program such that the replay execution breaks at a point corresponding to the faithful reproduction of a particular recorded execution event of interest. When the replay execution reaches the breakpoint a user can use a conventional debugging tool to inspect the state of the replay execution for the purpose of troubleshooting a program defect or bug.

In one embodiment, particular recorded execution events of interest at which breakpoints are to be set during the replay execution are provided as input to the record module. In one embodiment, the particular recorded execution events of interest are identified by a user from the execution recording. For example, the debugging tool and/or the replay module may provide a user interface for browsing, searching, and/or filtering the set of recorded execution events in the execution recording for recorded execution events of interest. As another example, the user interface might allow the user to keyword search for particular execution events by recorded execution event data. As yet another example, the user interface might present the set of execution events in chronological order as a set of selectable items on the user interface. As yet another example, the user interface might allow the user to specify filtering criteria for filtering the set of recorded execution events. Combinations of searches, lists, and filters may be employed. For example, the user interface might allow the user to filter a listing of recorded execution events returned as a search result by type or by the subroutine in which the corresponding execution events were captured.

Recorded execution events of interest may be identified to the record module before replay execution is initiated. In addition to or alternatively, recorded execution events of interest may be identified to the record module during replay execution. In one embodiment in which a record execution event of interest is identified to the record module during replay execution, the set of recorded execution events that are available for selection by the user include only the recorded execution events that occur after the current execution point in the replay execution. Recorded execution events that have already been replayed are not available for selection. In one embodiment, replay module maintains during replay execution the recorded execution events of interest as global data of the computer program. For example, the global data might be an ordered list, or other suitable data structure, of recorded execution event sequence numbers corresponding to the recorded execution events of interest.

Turning to the steps of the methodology of flowchart 500, steps 501 and 502 generally correspond to steps 401 and 402 of the methodology of flowchart 400 respectively except that the identified instrumentation locations are instrumented with execution event breakpoint code instead of execution event capture code. By virtue of the record and replay system's faithful reproduction of the original instruction execution sequence during the replay execution, the instrumentation locations are reached during the replay execution in the same order they were reached during the original recorded execution. In this way, a global execution sequence number maintained by the replay module and incremented for each execution of execution event breakpoint code is comparable to the recorded execution sequence numbers in the execution recording and can be used to detect when a recorded execution event of interest occurs during the replay execution.

Steps 503-508 are performed by execution breakpoint code to detect when a recorded execution event of interest occurs during the replay execution and to set a breakpoint when one occurs. Steps 503-508 are performed each time execution breakpoint code is executed during the replay execution.

Steps 503-508 will now be described in the context of executing execution event capture code instrumented at a location of the computer program.

At step 503, the execution event breakpoint code obtains the current value of the global execution sequence number maintained by the replay module. In one embodiment, the current value of the global execution sequence number is maintained by the replay module as a global variable of the computer program where it is accessible by execution event breakpoint code.

At step 504, the execution event breakpoint code determines whether an execution event has occurred during the replay execution that corresponds to a recorded execution event of interest. In one embodiment, determining whether a corresponding recorded execution event of interest has occurred includes consulting the global data representing a set of recorded execution events of interest to determine whether the current value of the global execution sequence number is included in that set. At step 505, if the current value of the global execution sequence number is in the set of recorded execution events of interest, then the methodology of flowchart 500 proceeds to step 506. Alternatively, the methodology skips step 506 and continues to step 507.

At step 506, the execution event breakpoint code, having determined at step 504 that an execution event of interest has occurred during replay execution, sets a breakpoint in the replay execution of the computer program so that the replay execution of the computer program breaks after the execution event breakpoint code has finished executing. In one embodiment, the execution event breakpoint code sets an instruction breakpoint or a conditional breakpoint at the first instruction of the computer program following the currently executing execution event breakpoint code. To set the breakpoint, the execution event breakpoint code may invoke a debugging API or other API capable of setting an instruction breakpoint or conditional breakpoint in a computer program. An example of such an API for JAVA programs is the JVMTI API. In particular, the JVMTI API provides the following subroutine for setting a breakpoint at a particular location in a specified method:

jvmtiError
SetBreakpoint(jvmtiEnv* env,
 jmethodID method,
 jlocation location)

Similar APIs may be available for other types of programs. It is expected that the particular technique used by execution event breakpoint code to set an instruction or conditional breakpoint may vary depending on the type of the computer program. In addition, it is expected that the particular technique may vary depending on the APIs available for setting an instruction or conditional breakpoint in the type of computer program. Embodiments of the invention are not limited to any particular technique and any suitable technique may be used.

At step 507, regardless if a breakpoint is set at step 506, the current value of the global execution sequence number is incremented. Note that step 507 may alternatively be performed between steps 503 and 504. At step 508, the replay execution is allowed to continue and, if a breakpoint was set at step 506, the replay execution will break at the breakpoint. When the breakpoint is reached, a debugging tool can be attached to the replay execution for the purpose of inspecting the state of the replay execution at the breakpoint. Other debugging operations may be performed at this point including setting new recorded execution event breakpoints based on recorded execution events that be reproduced later in the replay execution.

Log Amplification—Overview

Software computer programs often implement some form of logging for recording information about the computer program's execution. Trace logging is one form of logging useful for recording information about a software program's execution. The information recorded in a trace log may be used by programmers, system administrators, and other technical personnel to troubleshoot problems that occur during execution of the computer program.

To enable trace logging by a computer program, typically the source code of the program is instrumented with trace logging calls to a standard trace logging module. One example of a trace logging module available for JAVA programs is the Apache log4j package currently available at the Internet domain logging.apache.org in the folder log4j/. When the computer program is executed, the trace logging calls cause trace logging messages to be written to a trace log where they can be analyzed by troubleshooting personnel. A trace logging message written to a trace log may indicate, for example, a state of the software program's execution at the time of the call or other useful information for troubleshooting the program's execution.

A trace logging call can specify a trace logging severity and a trace logging message as parameters to the call. Typically, the trace logging severity parameter indicates one severity in a range of tracing severity to associate with the message. An example range of tracing severity from most severe to least severe is: "Error", "Warning", "Notice", "Info", "Debug", and "Trace".

To filter the trace logging messages that are stored in a trace log, a trace logging module may be configured to operate according to a specified trace logging level. The specified trace logging level affects what trace logging messages passed as parameters to trace logging calls are stored in a trace log during execution of the software program. In response to receiving a trace logging call, to determine whether a trace logging message passed in the call should be added to a trace log, the trace logging module may compare the trace logging severity passed in the call with the specified trace logging level. Trace logging messages associated with a trace logging severity that is less severe that the trace logging level will not be stored in a trace log and trace logging messages associated with a trace logging severity equal to or greater than the trace logging level will be stored in a trace log.

However, trace logging module logging levels offer an administrator with a limited choice. On the one hand, the administrator can configure the trace logging module with a trace logging level of relatively low severity such as, for example, "Info". This will cause the trace logging module to add a relatively large number of trace logging messages to a trace log than would otherwise be added if the trace logging level is set to a higher severity such as, for example, "Warning". A relatively low severity trace logging level may be used by the administrator to ensure that important trace logging messages are not missed if and when a problem occurs with the executing software program. However, setting a trace logging level to a relatively low severity in this way has several drawbacks. For one, excessive trace logging messages are added to trace log even when there is no problem occurring in the executing software program. When a problem does occur, the administrator must sift through the extraneous trace log messages in the trace log to find messages that are relevant to the problem at hand. For another, storing trace log messages in a trace log consumes computing resources such as disk space and CPU that are also needed by other operations of the executing software program. Thus, setting a trace logging level in this way may cause significant degradation in the computing performance of the executing software program noticeable to end-users.

On the other hand, the administrator can set the trace logging level to a relatively high severity such as, for example, Warning. Setting the trace logging level in this way may prevent significant degradation in computing performance, but at the expense of potentially missing important trace logging messages useful for debugging or diagnosing problems with execution of a software program.

Methodology for Log Amplification in a Record and Replay System

In one embodiment, a record and replay system such as, for example, the record and replay system 100 of FIG. 1, employs a methodology for log amplification. With the log amplification methodology, during recorded execution of a computer program in a record environment, a trace logging module used by the computer program may be configured with a relatively high severity level such as "Warning" or "Error" thereby conserving computing resources in the record environment. During a replay execution of the computer program in a replay environment using a record and replay system, the trace logging module is modified to output log messages at a relatively low severity level such as "Debug" or "Trace". In this way, a trace log is generated during replay that is equivalent to one that would have been generated during record had the trace logging module then been configured at the relatively low severity level, but without incurring the performance overhead in the record environment associated with the relatively low severity level. The log amplification methodology provides the performance benefits of relatively high logging severity levels while at the same time providing the informational benefits of relatively low logging severity levels.

FIG. 6 comprises a flowchart 600 illustrating a methodology for log amplification according to an embodiment of the invention. The methodology of flowchart 600 is described below in the context of the record and replay system 100 of FIG. 1. However, it should be understood that the methodology may be performed by any type of record and replay system or processing environment capable of performing the steps of the methodology as presented in detail below. Further, the methodology is explained by way of examples with reference to the Apache log4j logging module. However, the methodology is not limited to any particular logging module and other logging modules may be used.

Generally, the methodology of FIG. 6 involves steps to record, instrument, and replay. In step 601, Record, an original execution of computer program 101 is recorded in the record environment by record module 103 to identify one or more defects or bugs. For the original execution, a logging module of the program 101 is configured with a relatively high logging severity level such as "fatal", "error", or "warn". During the original execution, requests to log messages at various severity levels may be made of the logging module.

For example, the Apache log4j logging module by default supports the following logging severity levels in order decreasing severity: "fatal", "error", "warn", "info", "debug", and "trace". With the Apache log4j logging module, an instance of class Logger may be instantiated and assigned one of the default severity levels. Logging requests are made by invoking one of the printing methods of the Logger instance. Some of the basic methods in the Logger class including the printing methods are listed below:

```
package org.apache.log4j;
public class Logger {
// Creation & retrieval methods:
```

```
public static Logger getRootLogger( )
public static Logger getLogger(String name);
// printing methods:
public void trace(Object message);
public void debug(Object message);
public void info(Object message);
public void warn(Object message);
public void error(Object message);
public void fatal(Object message);
// generic printing method:
public void log(Level 1, Object message);
}
```

A log request of a Logger instance assigned level x specifying a severity level y will print or output a log message associated with the request, if y>=x. In one embodiment in which program 101 is a JAVA program, an instance of Apache log4j class Logger is instantiated and assigned a relatively high severity level such as "fatal", "error", or "warn". During the original execution, the printing methods of the instance are invoked repeatedly and variously and only invocations specifying a severity of "warn" or greater are printed or outputted to a log file or other log recording medium.

At step 602, one or more selected printing methods of the logging module of program 101 are instrumented with log amplification code prior the replay execution of program 101 at step 603. A function of log amplification code is to intercept log requests by program 101 of the logging module and print or output log messages based on a log amplification severity level that is separate and independent of the severity level assigned to the logging module by program 101. Specifically, the log amplification severity level overrides the severity level assigned to the logging module by program 101. In one embodiment, the log amplification severity level is maintained as a variable of program 101 during replay execution where it is accessible by log amplification code. The log amplification severity level may be user configurable so that a user can set a logging severity level for the logging module for the replay execution that is different from the logging severity level used during the original execution.

In one embodiment, during replay execution, the log amplification code receives a log request from the program 101 specifying a severity level and a log message. In response to the receiving the log request, the log amplification code compares the specified severity level to the log amplification severity level. If the specified severity level is greater than or equal to the log amplification severity level, then the log message is printed or outputted irrespective of the severity level assigned to the logging module by the program 101. In this way, the log amplification code can, during replay execution, amplify the log output of the original recorded execution.

At step 603, Replay, the original execution of program 101 is replayed with the instrumented log amplification code. As a result, an amplified log is produced. The Replay step can be performed by a developer or tester who has received a bug report that contains an attached execution recording. Thus, the log amplification approach herein enables the developer to generate a detailed trace log in conjunction with replaying a recorded execution of a computer program without having to incur the computing performance overhead associated with such detailed trace logging when recording the original execution.

Implementing Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
    recording information for a plurality of execution events that occur during a recorded execution of a computer program, the information comprising a unique identifier for respective ones of the plurality of execution events, the unique identifier provides an ordering of recorded execution events in order of their occurrence during execution of the computer program;
    replaying execution of the computer program in which execution events of the plurality of execution events are replayed in the same order in which they occurred during execution of the computer program;
    determining that a breakpoint should be set at a point in the replay execution of the computer program at a point corresponding to a particular execution event of the plurality of execution events, the determination is based on the unique identifier for respective ones of the plurality of execution events; and
    setting a breakpoint in the replay execution of the computer program at a point corresponding to the particular execution event responsive to the determination;
    wherein the steps of the method are performed by one or more computing devices.

2. The method according to claim 1, wherein said recording information further comprises:
    obtaining a sequence number for respective ones of the plurality of execution events, the sequence number for a given execution event being the unique identifier for the given execution event;
    obtaining data pertaining to the plurality of execution events; and storing, in a memory, the sequence number for respective ones of the plurality of execution events in association with the data for respective ones of the plurality of execution events.

3. The method according to claim 2, wherein said obtaining data further comprises obtaining any of (a) a value of a parameter passed to a subroutine of the computer program or (b) a value of a global variable of the computer program.

4. The method according to claim 1, further comprising prior to the recording information, instrumenting the computer program with logic for performing the recording information.

5. The method according to claim 1, wherein the particular execution event corresponds to a particular invocation of a subroutine of the computer program during the recorded execution of the computer program.

6. The method according to claim 1, further comprising, prior to the replaying execution of the computer program, instrumenting the computer program with logic for determining that the breakpoint should be set and for the setting the breakpoint.

7. The method according to claim 1, further comprising:
assigning sequence numbers to the respective ones of the plurality of execution events during the recorded execution of the computer program, the sequence numbers being the unique identifiers;
assigning the sequence numbers to the corresponding ones of the plurality of execution events
during the replay execution of the computer program;
wherein the determining that a breakpoint should be set further comprises determining that the replaying execution of the computer program has reached a point at which the sequence number for the particular event has been reached.

8. The method according to claim 7, further comprising, after the recorded execution of the computer program, receiving input indicating an execution event of interest, wherein the execution event of interest is the particular execution event, wherein the input is used to identify the corresponding sequence number assigned during the recorded execution to the particular execution event.

9. The method according to claim 1, wherein the setting a breakpoint further comprises setting an instruction breakpoint at an instruction of the computer program.

10. The method according to claim 9, wherein the instruction at which the instruction breakpoint is set is the first instruction of a subroutine.

11. A computer readable storage medium comprising stored processor executable instructions which when executed by a processor cause the processor to:
record information for a plurality of execution events that occur during a recorded execution of a computer program, the information comprising a sequence number for respective ones of the plurality of execution events;
replay execution of the computer program in which execution events of the plurality of execution events are replayed in order of their respective sequence numbers;
receive an identification of a particular execution event of the plurality of execution events at which a breakpoint is to be set during the replay execution of the computer program;
determine a point in the replay execution of the computer program that corresponds to the particular execution event based on the sequence numbers for respective ones of the plurality of execution events; and
set a breakpoint in the replay execution of the computer program at the point corresponding to the particular execution event responsive to the determination of the point.

12. The computer readable storage medium of claim 11, wherein the instructions which when executed by the processor cause the processor to determine a point in the replay execution of the computer program that corresponds to the particular execution event based on the sequence numbers for respective ones of the plurality of execution events cause the process to:
determine that the replay execution of the computer program has reached a point at which the sequence number for the particular event has been reached.

13. The computer readable storage medium of claim 11, wherein the instructions which when executed by the processor cause the processor to record information for a plurality of execution events further cause the processor to:
obtain data pertaining to respective ones of the plurality of execution events; and
store the data pertaining to respective ones of the plurality of execution events in association with the sequence numbers for respective the ones of the plurality of execution events.

14. The computer readable storage medium of claim 13, wherein the instructions which when executed by the processor further cause the processor to:
provide the data for respective ones of plurality of execution events in a user interface; and
receive a selection of the particular execution event in the user interface in response to providing the data for respective ones of plurality of execution events.

15. The computer readable storage medium of claim 13, wherein the instructions which when executed by the processor cause the processor to obtain data pertaining to respective ones of the plurality of execution events cause the processor to:
obtain any of (a) a value of a parameter passed to a subroutine of the computer program or (b) a value of a global variable of the computer program.

16. A system comprising:
a processor configured to:
record information for a plurality of execution events that occur during a recorded execution of a computer program, the information comprising a sequence number for respective ones of the plurality of execution events and data for respective ones of the plurality of execution events;
provide the data for respective ones of plurality of execution events in a user interface;
receive a selection of a particular execution event for which a breakpoint is to be set in response to providing the data for respective ones of plurality of execution events in the user interface;
replay execution of the computer program in which execution events of the plurality of execution events are replayed in order of their respective sequence numbers; and
set a breakpoint in the replay execution of the computer program at a point corresponding to the particular execution event during the replay based on the sequence number for the particular execution event.

17. The system to claim 16, wherein the processor is further configured to:
assign the sequence numbers to the respective ones of the plurality of execution events during the recorded execution of the computer program;
assign the sequence numbers to corresponding ones of the plurality of execution events during the replay execution of the computer program;
wherein the processor being configured to set a breakpoint in the replay execution of the computer program further comprises the processor being configured to determine that the replay execution of the computer program has reached a point at which the sequence number for the particular execution event has been reached.

18. The system to claim 16, wherein the data for respective ones of the plurality of execution events comprises any of (a) a value of a parameter passed to a subroutine of the computer program or (b) a value of a global variable of the computer program.

19. The system to claim 16, wherein the processor is further configured to, prior to the replay execution of the computer program, instrument the computer program with logic to set the breakpoint in the replay execution of the computer program at the point corresponding to the particular execution event.

20. The system to claim 16, wherein the particular execution event corresponds to a particular invocation of a subroutine of the computer program during the recorded execution of the computer program.

* * * * *